J. ROWBOTHAM.
Kindling-Wood Bale.
No. 167,124.          Patented Aug. 24, 1875.
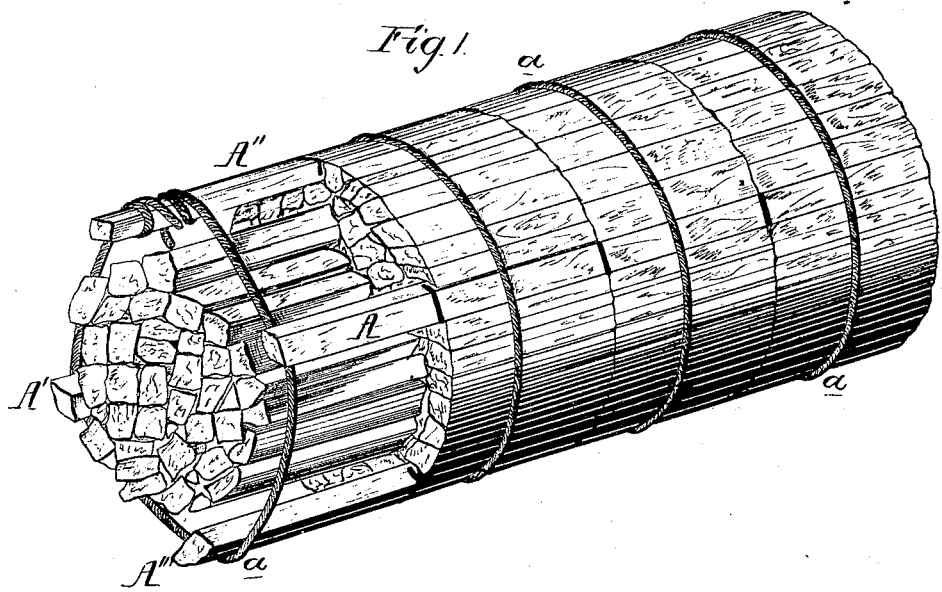
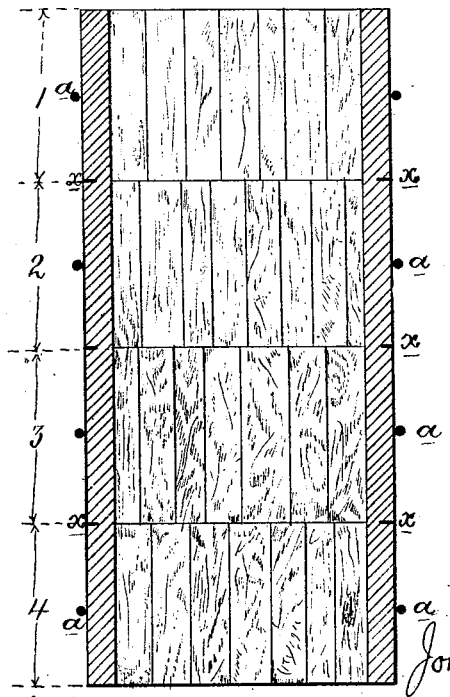
Witnesses,
Harry Smith
Hubert Howson
John Rowbotham
by his Attorneys,

UNITED STATES PATENT OFFICE.

JOHN ROWBOTHAM, OF PHILADELPHIA, PENNSYLVANIA, ASSIGNOR TO WILLIAM ROWBOTHAM, OF SAME PLACE.

IMPROVEMENT IN KINDLING-WOOD BALES.

Specification forming part of Letters Patent No. 167,124, dated August 24, 1875; application filed May 21, 1875.

*To all whom it may concern:*

Be it known that I, JOHN ROWBOTHAM, of Philadelphia, Pennsylvania, have invented an Improved Kindling-Wood Bale, of which the following is a specification:

The object of my invention is to dispense with the usual measuring crates and barrels in which kindling-wood has heretofore been transported and sold by putting up the wood in such bales that they will be convenient for storage and transportation, and permit portions of each bale to be removed without materially disturbing the remainder. This object I attain in the manner which I will now proceed to describe, reference being had to the accompanying drawing, in which—

Figure 1 is a perspective view, and Fig. 2 a sectional view, of my improved bale of firewood.

The bale is composed of a number of bundles (four in the present instance) of sticks of kindling-wood, of about the same dimensions as the loose sticks usually sold in barrels or crates, the use of which as a medium for transporting and determining the quantities of the wood I entirely discard by placing the bundles which are numbered in the drawing 1, 2, 3, and 4 end to end, and binding them together, so as to form a bale, which shall contain a given quantity or bulk of sticks, and which can be transported without the aid of the usual barrels or crates.

I prefer the following mode of securing the several bundles together:

Each bundle is composed of a group of sticks of the length of the said bundle, combined with sticks A, A', A'', and A''', which extend throughout the entire length of the bale, these long sticks, which may vary in number, being arranged at equal, or nearly equal, distances apart, and forming, with the short sticks, a cylindrical, or nearly cylindrical, bale, as shown in Fig. 1, the long sticks being always on the outside of the bale.

Whenever one group or bundle of short sticks meets an adjoining bundle I prefer to nearly sever the long sticks, as shown at $x$, the short sticks of each bundle being bound together and to the long sticks by cords $a$, so as to convert the whole into a compact bale, well adapted for transportation and convenient for storage.

It will be seen that the integrity of the bale, as far as the several bundles are concerned, is dependent in this instance upon the long sticks, which, although partly severed, are sufficiently strong to prevent the disintegration of the bale under ordinary handling.

When a bundle is required for use or sale all that is necessary is to exert sufficient force on the bundle to be detached to break the long sticks at the partly-severed points desired, the bundle detached retaining its integrity, owing to the cord which surrounds it.

Should a portion only of a bundle be required, as many sticks as may be demanded may be removed, and the cord wrapped round the remaining sticks, as shown in Fig. 1.

Although I prefer the use of long sticks as a medium, in connection with the cords, of maintaining the integrity of the bundle, the several bundles may be combined in a bale which admits of being handled and transported without fear of disintegration by passing cords longitudinally over the ends of the bale, these cords being so connected to those of the different bundles that one bundle may be removed without disturbing the integrity of the bale.

I claim as my invention—

As a new article of merchandise, a bale of kindling-wood consisting of detachable bundles connected together so as to form the said bale, substantially as described.

In testimony whereof I have signed my name to this specification in the presence of two subscribing witnesses.

JOHN ROWBOTHAM.

Witnesses:
HUBERT HOWSON,
HARRY SMITH.